(12) United States Patent
Knudsen et al.

(10) Patent No.: US 8,410,731 B2
(45) Date of Patent: Apr. 2, 2013

(54) ACTUATOR

(75) Inventors: Martin Kahr Knudsen, Sydals (DK); René Sørensen, Gråsten (DK); Anders B. Lorenzen, Åbenrå (DK)

(73) Assignee: Linak A/S, Nordborg (DK)

( * ) Notice: Subject to any disclaimer, the term of this patent is extended or adjusted under 35 U.S.C. 154(b) by 336 days.

(21) Appl. No.: 12/735,304

(22) PCT Filed: Jan. 9, 2009

(86) PCT No.: PCT/DK2009/000003
§ 371 (c)(1),
(2), (4) Date: Jul. 1, 2010

(87) PCT Pub. No.: WO2009/086832
PCT Pub. Date: Jul. 16, 2009

(65) Prior Publication Data
US 2010/0283421 A1 Nov. 11, 2010

(30) Foreign Application Priority Data
Jan. 12, 2008 (DK) .................................. 2008 00047

(51) Int. Cl.
*H02K 41/02* (2006.01)
*H02K 7/00* (2006.01)
(52) U.S. Cl. ............................................ 318/135; 318/9
(58) Field of Classification Search ................ 318/9–15, 318/135
See application file for complete search history.

(56) References Cited

U.S. PATENT DOCUMENTS

| 3,968,705 | A | 7/1976 | Amano et al. |
| 4,407,030 | A | 10/1983 | Elliott |
| 6,201,481 | B1 | 3/2001 | Bellingroth |
| 7,402,966 | B2 * | 7/2008 | Bellingroth .................. 318/135 |

* cited by examiner

*Primary Examiner* — Derek Rosenau
(74) *Attorney, Agent, or Firm* — Dykema Gossett PLLC

(57) ABSTRACT

Linear actuator (1) comprising an electric motor connected to a spindle via a transmission, on said spindle is mounted a spindle nut secured to an activation element (2), said activation element (2) being equipped with a front attachment (3). The actuator (1) is further furnished with a rear attachment (4), which is axially displaceable between defined stops. The rear attachment (4) activates a switch (7) in at least one of the displaceable positions of the rear attachment (4).

8 Claims, 3 Drawing Sheets

ACTUATOR

BACKGROUND OF THE INVENTION

1. Field of the Invention

The invention relates to a linear actuator that includes at least one attachment for mounting the actuator and an electric control.

2. The Prior Art

Linear electric actuators are widely used in connection with adjustable furniture such as beds, chairs and tables, where they serve to adjust, e.g., the back rest and leg rest section of a bed, or the height of a table. Electric actuators may also advantageously be used in care equipment like, e.g., a patient lift, which serve to lift and lower a patient, e.g., from above and into a chair or a bed.

In connection with the adjustment of furniture and care equipment such as the types mentioned above, personal safety is an area of priority. During the adjustment an actuator produces large forces, which may result in major injuries of patients and staff if a part of the body unintentionally blocks the mechanical adjustment mechanisms. When a patient lift of the crane type consisting of a tower having a cantilever arm for lifting and lowering a patient is concerned, the same problem occurs. To lift a patient, as opposed to lowering the patient, requires that the actuator exercises a power. However, it is during the lowering that a risk for squeeze injuries occurs. Particularly, squeeze injuries may occur as the cantilever arm of the patient lift, after the patient has been brought into contact with the base, continues to move downwards, hits the patient and performs an increasing pressure on the patient, resulting in injuries. The same applies to beds and chairs where lowering of a sitting or lying surface may cause squeeze injuries.

U.S. Pat. No. 6,201,481 to Okin discloses a safety device for electrically-adjustable articles of furniture wherein a trapped object will activate a switch in the form of a squeezing list, which subsequently cuts off the current to the actuator. The arrangement requires that squeezing lists are mounted on all the surfaces where a risk of squeezing exists. On a bed that would typically be between the bed frame and the back rest and leg rest sections. The solution is expensive and not particularly reliable.

U.S. Pat. No. 4,407,030 to Maxwell Products, Inc. discloses a safety device for an adjustable bed where a back rest section and a leg rest section may be adjusted by means of a linear actuator each. By means of the rear attachment, the actuators are secured to the bed construction with a shaft led through an oblong hole. At one end of the hole, a switch is located. During normal operation, the shaft is pulled forward in the hole free of the switch. If something is trapped between the back rest section and the bed frame, the shaft will be pushed backwards in the oblong hole and thus activate the switch for cutting off the current for the motor. The arrangement provides a useful solution to the problem but is not practical since the switch is mounted as a separate attachment, which should be fitted individually and requires a cable connection to either the actuator or the control. Such a cable connection is not only difficult and expensive but also vulnerable to mechanical damages.

A solution is therefore needed which in a safe and simple manner solves the problem of squeeze injuries during adjustment of the aids and articles of furniture mentioned above.

The purpose of the invention is to provide a simple solution to the outlined problem.

SUMMARY OF THE INVENTION

This is achieved according to the invention in that the linear actuator is constructed such that the attachment is located in connection with at least one switch and the attachment is freely displaceable in its axial direction in the actuator between a first and a second position, where the attachment in at least one position activates the switch.

In this way, a solution to the outlined problem is provided in that the switch is located in a position near the rear attachment of the actuator contained in the housing for the actuator. The solution is immediately practically realizable, reliable and financially attractive. First and foremost, it is integrated in the actuator and does not require mounting of further parts on the construction in which the actuator is integrated. Another important advantage is that a trapped object is only affected at a minimum as the attachment is freely movable.

The effect being used in the invention is that the actuator, when this moves the spindle nut in one direction, lifts or pulls a load. In the other direction, it controls the lowering of the load. If the movement of the load is stopped in the reversing direction of an obstacle the actuator would enter into a situation, in which it attempts to pull the front and rear attachment closer together or push these further apart depending on whether the actuator lifts or pulls a load. As an attachment, typically the rear attachment, is constructed in such a way that it, relative to the actuator housing, freely, without hindrance, may be displaced axially between two positions, the rear attachment will be displaced from one extreme position to the other. By mounting at least one switch, which monitors the position of the rear attachment, it is possible directly through the switch or by means of a control to cut off the current for the actuator when a situation indicating a blocking and thus a possible squeezing occurs.

The invention is particularly simple in that a simple switch may be used for the purpose. The switch is mounted directly on the actuator or a printed circuit board in the actuator. As the switch only cuts off the current for the actuator for operation in one direction, it is possible to reverse the actuator allowing the trapped object to be easily removed. In this connection the control may be configured in such a way that an automatic reversing happens when the switch is activated.

In a particular embodiment, the attachment is mounted on the actuator by means of a spline connection. More precisely, the parts in the spline connection, composed of the attachment and a counter part in the actuator, are axially displaceable relative to each other. The spline connection thus freely performs an axial displacement in the longitudinal direction, but retains the attachment against rotation.

Moreover, the counter part in the actuator may be designed to form a stop for the axial displacement of the attachment in at least one direction, e.g., in that at least one guide in the spline connection is closed in one end or that there is a stop on at least one list or pin in the spline connection. In this way there is a distance in the axial direction of the actuator, where the attachment is freely displaceable in the longitudinal direction, until the attachment is moved all the way into the spline connection to a mechanical stop.

As the axially displaceable attachment is partly surrounded by a housing which surrounds the actuator, the housing functions as a stop for the axial movement of the attachment in at least one direction thus preventing the attachment from moving out of the spline connection.

In an embodiment, the spline connection consists of a number of pins, typically four pins, which slides in matching guides in the actuator. This is particularly practical in that at least one of the pins on the attachment moreover may activate the switch. This is made possible in that the switch is located near the pin in a position where the switch is activated when the pin together with the rear attachment is displaced axially relatively to the actuator. The switch may expediently be mounted in a recess or hollowness in the actuator in connection with the spline connection.

The axially displaceable attachment is a simple construction contained in the actuator and does therefore not take up room. That the invention is described in connection with the rear attachment does not exclude the possibility that it could be realized by means of another attachment of the actuator, e.g., the front attachment.

All wiring in connection with the safety function is internally in the actuator and therefore replaces wiring for connecting the squeeze protection.

BRIEF DESCRIPTION OF THE DRAWINGS

An embodiment for the linear actuator according to the invention will be described more fully below with reference to the accompanying drawings.

DETAILED DESCRIPTION OF THE PREFERRED EMBODIMENTS

Figures 1, 2:
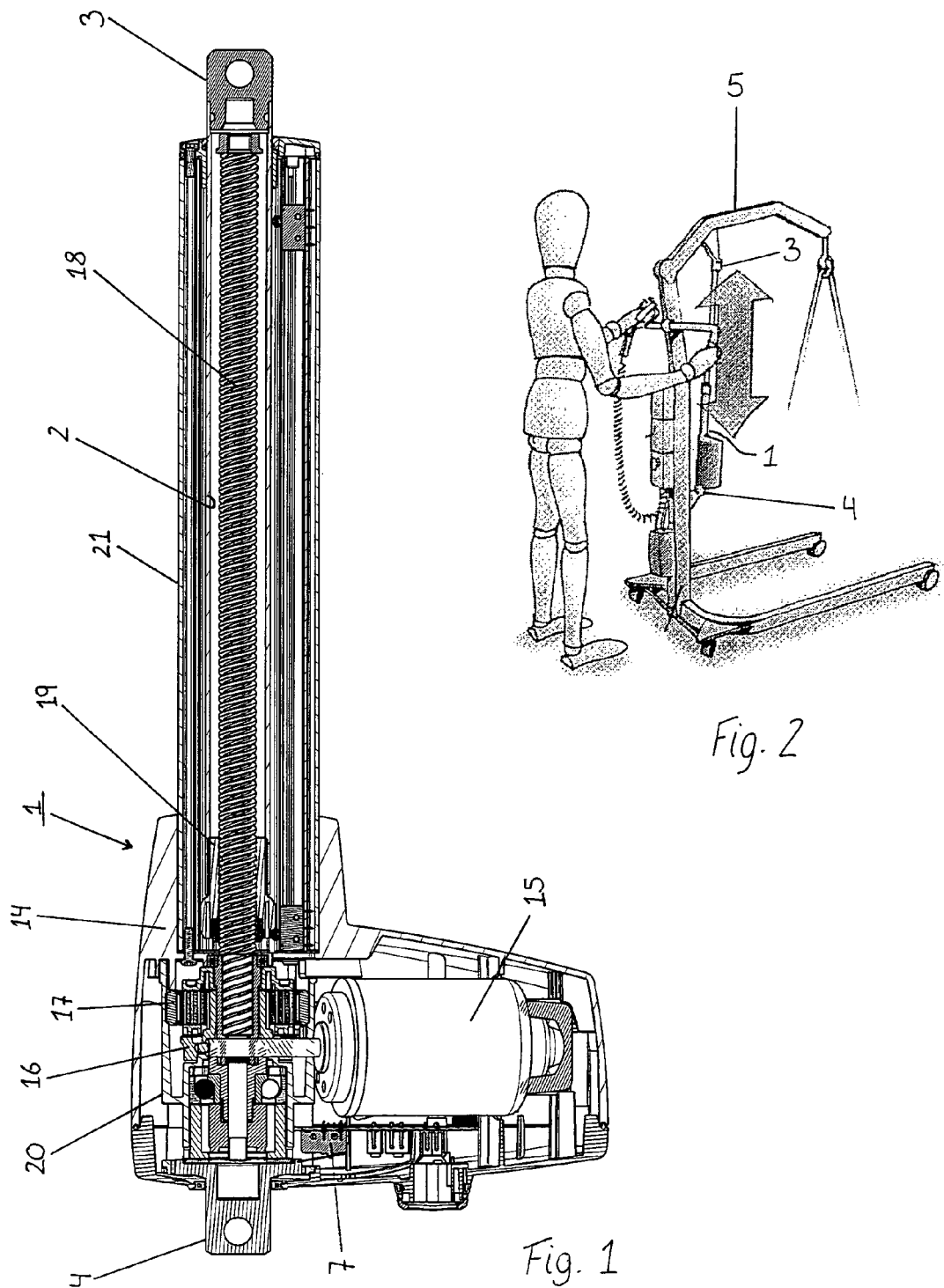
FIG. 1 shows a longitudinal section through an electrically driven actuator.
FIG. 2 shows a patient lift.

The electrically driven linear actuator 1 shown in FIG. 1 is constructed with a housing 14 including a reversible low-voltage DC motor 15, which over a worm drive 16 and planetary gear 17, drives a spindle 18, on which is located a spindle nut 19 secured against rotation. The worm drive 16 and the planetary gear 17 are located in a tubular hollowness in a console 20 mounted on the front end of the motor 15. A guide tube 21 for an activation element 2 in the form of a tubular rod has one end secured to the housing 14. The activation element 2 is with its rear end secured to the spindle nut 19 while a front attachment 3 is mounted to the front end for mounting of the actuator in a construction with a movable part embedded in a relatively thereto stationary part like, e.g., a patient lift. The other end, the rear end of the actuator, is furnished with a rear attachment 4 for securing to the stationary part of the construction. When the actuator moves the activation element 2 in one or the other direction, it will therefore adjust the movable part of the construction.

The construction shown in FIG. 2, is a patient lift of the crane type having a cantilever arm 5 indented to carry the load. The cantilever arm 5 is rotatably embedded about a horizontal axis at the upper end of a tower in a frame part of the construction so that the cantilever arm is moved in the vertical plane. By means of the actuator 1, the cantilever arm 5 may be adjusted in height and thus raise and lower a load connected thereto as the actuator 1 with the front attachment 3 is connected to the cantilever arm and with the rear attachment 4 is connected to the frame part at the bottom of the tower.

Figure 3:
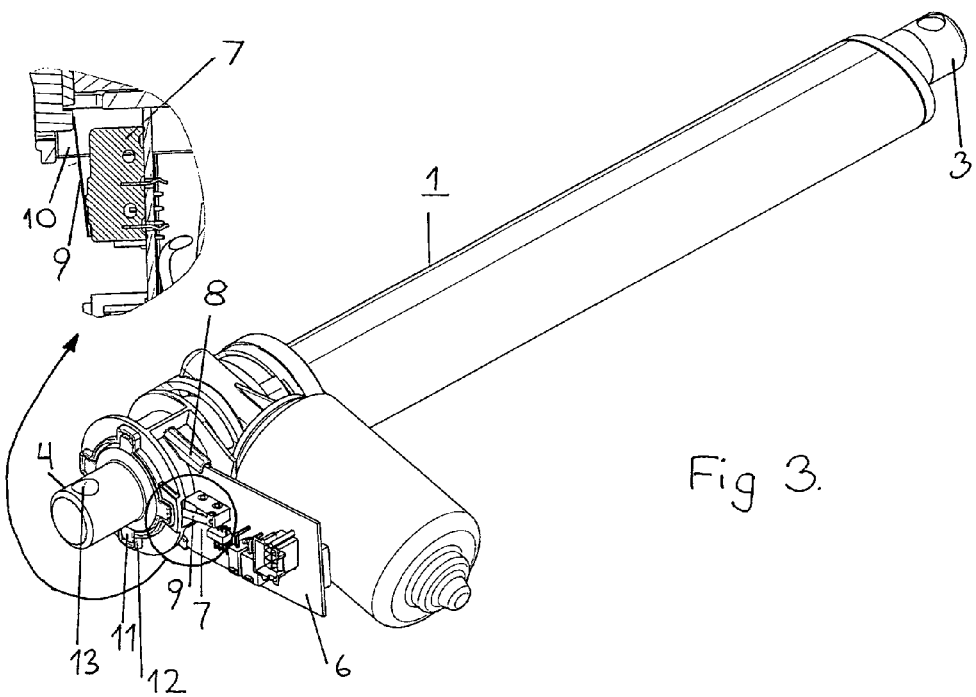
FIG. 3 shows the actuator in FIG. 1 without housing with a detailed view of a printed circuit board for a switch seen in an axially displaced position of the rear attachment where the switch is activated.
Figure 4:
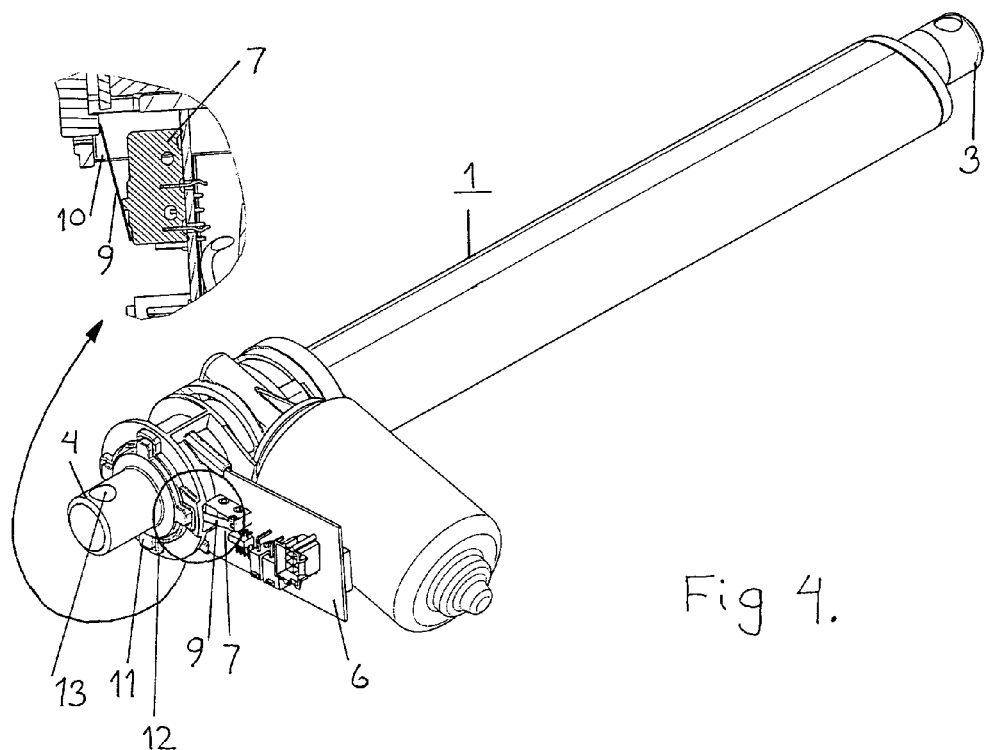
FIG. 4 shows the actuator in FIG. 3, with a detailed view of the printed circuit board for the switch seen in an axially displaced position of the rear attachment where the switch is not activated.

FIGS. 3 and 4 show the actuator 1 without housing. In connection with the rear attachment 4 there is an arrangement with a printed circuit board 6 and a switch 7. The rear attachment 4 is arranged in an axially displaceable manner so that the displacement in at least one of the two end positions activates the switch 7. The state of the switch 7 thus expresses the position of the rear attachment. FIG. 3 shows the situation where the axially displaceable rear attachment 4 activates the switch 7, and FIG. 4 shows the situation where the axially displaceable rear attachment 4 does not activate the switch 7. In the patient lift, the actuator 1 would normally be subject to compression due to the tare weight and the load and the rear attachment 4 would thus assume its innermost position, i.e., pushed into the actuator as shown in FIG. 3. The rear attachment 4 is as such fixed while the rest of the actuator 1 is pushed down over the rear attachment 4. When the load is lowered, the load will, until completely lowered and in connection with the base, cause the actuator to constantly be subject to compression. In case the actuator subsequently begins to perform compression on the load in downwards direction corresponding to that the actuator performs a pull, the axially displaceable rear attachment 4 will be displaced towards its other outermost position and thus switch the state of the switch. As the rear attachment is fixed, it is actually the rest of the actuator 1 which is pulled outwards or upwards to the position shown in FIG. 4. The switch 7 may either directly cut off the current to the actuator 1 or function as a control signal for the control, which then handles the cutting off of the current to the actuator 1. Alternatively, the control may reverse the actuator 1, so that the activation element 2 is pushed outwards and the pressure on the load is reversed so that the axially displaceable rear attachment 4 again is displaced towards the other perimeter for the displacement and changes the state of the switch.

In detail, the switch 7 is mounted on a printed circuit board 6 inserted into a guide 8 in the housing. The contact arm 9 of the switch is inserted into a recess 10 in the housing, where the axially displaceable rear attachment 4 may be displaced and activate the switch 7. The rear attachment 4 is furnished with four pins 11, which function as a spline connection in connection with the four guides 12 in the actuator 1. This means that the rear attachment 4 may be mounted on the actuator 1 so that the eye 13 may be rotated ninety degrees thus allowing the actuator 1 to be quickly adapted and mounted in the construction. One of the guides 12 is connected to the recess 10, in which the contact arm 9 of the switch is located, where a pin 11 in the spline connection on the rear attachment serves to activate the switch 7. The depth of the same guides 12 also determines the size of the axial displacement of the rear attachment 4 in one of the directions. To ensure that the rear attachment 4 cannot be pulled out of the construction, an outer shell of the housing 1 locks the rear attachment 4 by surrounding this and forming a stop therefor.

FIGS. 3 and 4 are shown as two detailed views. As it appears from the detailed view in FIG. 3, the displaceable rear attachment 4 is displaced into the guide 12 and is thus in its normal state where the actuator 1 carries a load and therefore is under compression. The switch 7 is in this state activated, and thus enables a reversing of the direction so that a load is lowered. The detailed view in FIG. 4, shows what will happen when the load is lowered and in contact with the base and the actuator 1 accordingly enters into tension and performs a tension on the load. The axially displaceable rear attachment 4 will be displaced so that the switch 7 is deactivated and cuts off the current for the actuator 1, so that this does not perform an increased pressure on the load. As the switch 7 only cuts off for operation of the actuator 1 in the tension situation, the actuator 1 may very well be brought to reverse so that the pressure on the load is removed. As soon as the axial displaceable rear attachment 4 again is displaced and has activated the switch 7, it is possible in the usual manner to continue driving the actuator 1 in the other direction.

Figure 5:
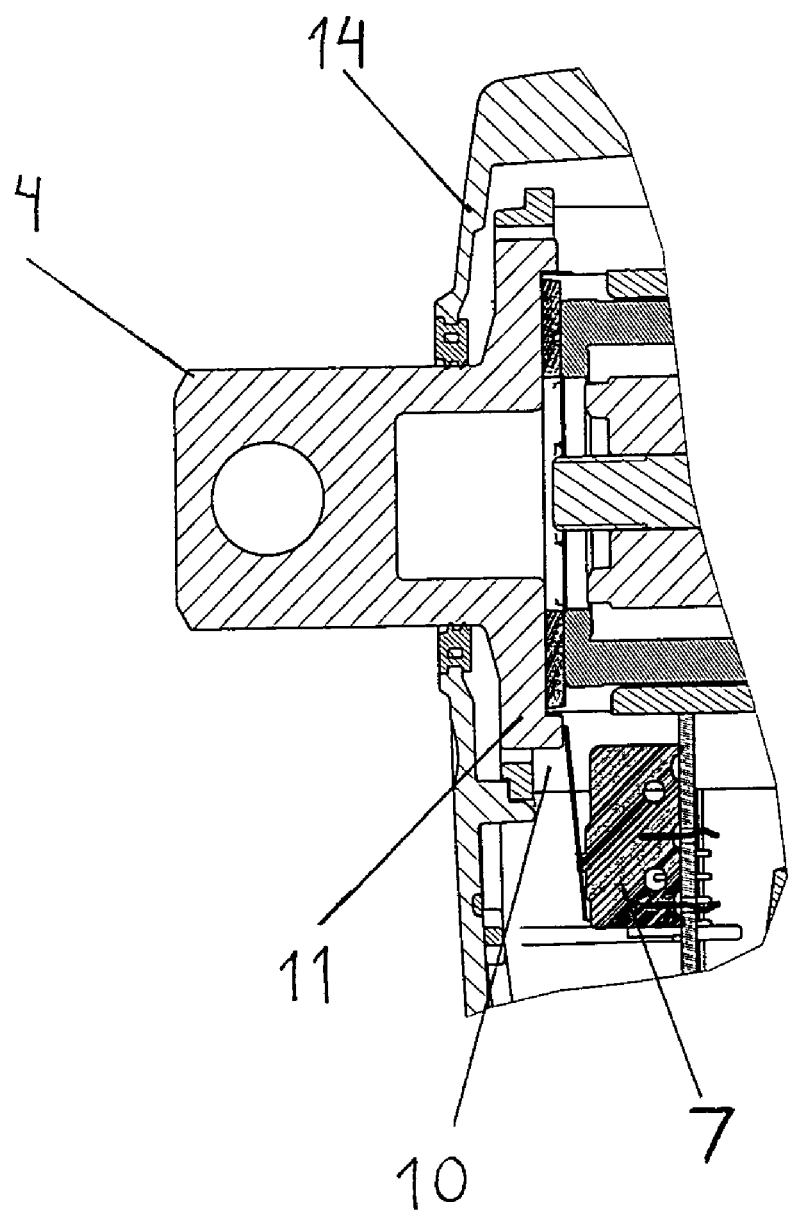
FIG. 5 shows a detailed view of the displaceable rear attachment.

The detailed view in FIG. 5, shows the two physical stops for the movement of the displaceable rear attachment 4, which constitutes the bottom of the guides of the spline connection 12 in one direction and the housing 14 in the other direction. As it appears from the drawings, the switch is activated when the rear attachment 4 is displaced out of the actuator and thus interrupting the movement. The function of the housing as stop for the movement in one direction will therefore normally not be used.

It will be appreciated that, in the mounted state of the actuator, the rear attachment is fixed while the rest of the actuator is displaced axially relatively to the rear attachment.

It will be appreciated that the invention may also be used in connection with actuators which are normally subject to tension. The switch 7 will then merely function conversely.

That the invention here is described in connection with a patient lift does not exclude the use of the invention in connection with other types of adjustable furniture, such as, e.g., a hospital, care or home bed, a chair or a table.

The invention claimed is:

1. A linear actuator comprising:
   an electric motor,
   a transmission,
   a spindle which is driven by the electric motor through the transmission,
   a spindle nut located on the spindle and secured against rotation,
   an activation element connected to the spindle nut,
   a rear attachment and a front attachment for mounting the actuator,
   an electric control, and
   at least one switch located in connection with the rear attachment,
   wherein the rear attachment is arranged freely displaceable in an axial direction in the actuator between a first position and a second position, such that the rear attachment at least in one of said first and second positions activates the switch.

2. The linear actuator according to claim 1, including a printed circuit board on which the switch is mounted.

3. The linear actuator according to claim 1, wherein the rear attachment is mounted on the actuator by means of a spline connection.

4. The linear actuator according to claim 3, wherein parts of the spline connection are axially displaceable relative to each other and form a stop for the axial displacement of the rear attachment in at least one direction.

5. The linear actuator (1) according to claim 1, including a housing which partially surrounds the rear attachment, said housing functioning as a stop for the axial movement of the rear attachment in at least one direction.

6. The linear actuator according to claim 3, wherein the spline connection includes at least one pin on the rear attachment for activating the switch (7).

7. The linear actuator according to claim 1, wherein the switch is mounted in a recess in the actuator in connection with the spline connection on the rear attachment.

8. The linear actuator according to claim 1, wherein said rear attachment includes a connection eye.

* * * * *